(12) United States Patent
Birkbeck et al.

(10) Patent No.: US 9,269,156 B2
(45) Date of Patent: Feb. 23, 2016

(54) METHOD AND SYSTEM FOR AUTOMATIC PROSTATE SEGMENTATION IN MAGNETIC RESONANCE IMAGES

(71) Applicants: Neil Birkbeck, Plainsboro, NJ (US); Jingdan Zhang, Plainsboro, NJ (US); Martin Requardt, Nuremberg (DE); Berthold Kiefer, Erlangen (DE); Peter Gall, Buckenhof (DE); Shaohua Kevin Zhou, Plainsboro, NJ (US)

(72) Inventors: Neil Birkbeck, Plainsboro, NJ (US); Jingdan Zhang, Plainsboro, NJ (US); Martin Requardt, Nuremberg (DE); Berthold Kiefer, Erlangen (DE); Peter Gall, Buckenhof (DE); Shaohua Kevin Zhou, Plainsboro, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 214 days.

(21) Appl. No.: 13/947,300

(22) Filed: Jul. 22, 2013

(65) Prior Publication Data

US 2014/0029823 A1    Jan. 30, 2014

Related U.S. Application Data

(60) Provisional application No. 61/674,912, filed on Jul. 24, 2012.

(51) Int. Cl.
*G06T 7/00* (2006.01)
*G06T 5/00* (2006.01)

(52) U.S. Cl.
CPC .............. *G06T 7/0081* (2013.01); *G06T 5/009* (2013.01); *G06T 7/0089* (2013.01); *G06T 2200/04* (2013.01); *G06T 2207/10088* (2013.01); *G06T 2207/20016* (2013.01); *G06T 2207/20081* (2013.01); *G06T 2207/30081* (2013.01)

(58) Field of Classification Search
None
See application file for complete search history.

(56) References Cited

U.S. PATENT DOCUMENTS

| | | | |
|---|---|---|---|
| 7,916,919 B2 | 3/2011 | Zheng et al. | |
| 8,073,252 B2 | 12/2011 | Florin et al. | |
| 2003/0100828 A1 | 5/2003 | Engelhard et al. | |
| 2007/0014462 A1 | 1/2007 | Rousson et al. | |
| 2009/0326363 A1 | 12/2009 | Li et al. | |
| 2010/0074499 A1 | 3/2010 | Wels et al. | |
| 2010/0134517 A1 | 6/2010 | Saikaly et al. | |
| 2010/0286517 A1 | 11/2010 | Kamen et al. | |
| 2011/0116698 A1* | 5/2011 | Weis et al. | 382/131 |
| 2013/0034282 A1 | 2/2013 | Kaufman et al. | |
| 2013/0064439 A1 | 3/2013 | Khurd et al. | |

OTHER PUBLICATIONS

Liney, Gary P., Lindsay W. Turnbull, and Adrian J. Knowles. "A simple method for the correction of endorectal surface coil inhomogeneity in prostate imaging," Journal of Magnetic Resonance Imaging 8, No. 4 (1998): 994-997.*

(Continued)

*Primary Examiner* — Vikkram Bali
*Assistant Examiner* — Tracy Mangialaschi

(57) ABSTRACT

A method and system for fully automatic segmentation the prostate in magnetic resonance (MR) image data is disclosed. Intensity normalization is performed on an MR image of a patient to adjust for global contrast changes between the MR image and other MR scans and to adjust for intensity variation within the MR image due to an endorectal coil used to acquire the MR image. An initial prostate segmentation in the MR image is obtained by aligning a learned statistical shape model of the prostate to the MR image using marginal space learning (MSL). The initial prostate segmentation is refined using one or more trained boundary classifiers.

21 Claims, 4 Drawing Sheets

(56) References Cited

OTHER PUBLICATIONS

Dawant, Benoit M., Alex P. Zijdenbos, and Richard A. Margolin. "Correction of intensity variations in MR images for computer-aided tissue classification." Medical Imaging, IEEE Transactions on 12, No. 4 (1993): 770-781.*

Axel, Leon, Jay Costantini, and John Listerud. "Intensity correction in surface-coil MR imaging." American Journal of Roentgenology 148, No. 2 (1987): 418-420.*

Zheng, Yefeng, et al. "Four-chamber heart modeling and automatic segmentation for 3-D cardiac CT volumes using marginal space learning and steerable features." Medical Imaging, IEEE Transactions on 27.11 (2008): 1668-1681.*

Cootes, Timothy F., et al. "The use of active shape models for locating structures in medical images." Information Processing in Medical Imaging. Springer Berlin Heidelberg, 1993.*

Van Ginneken, Bram, et al. "Active shape model segmentation with optimal features." medical Imaging, IEEE Transactions on 21.8 (2002): 924-933.*

Cootes T.F. et al., "Active Shape Models—Their Training and Application", Computer Vision and Image Understanding, 61(1), Jan. 1995, pp. 38-59.

Cox, I.J. et al., "Dynamic Histogram Warping of Images Pairs for Constant image Brightness", In IEEE International Conference on Image Processing, vol. II Washington D.C., USA, Oct. 1995.

Georgescu, B. et al., "Database-Guided Segmentation of Anatomical Structures with Complex Appearance", In IEEE Comp. Soc. Conf. Comp. Vis. Pat. Recog., San Diego, CA, USA, Jun. 2005.

Gower, J.C., Generalized Procrustes Analysis, Psychometrika 40(1), Mar. 1975, pp. 33-50.

Tu, Z. "Probabilistic Boosting-Tree: Learning and Discriminative Models for Classification, Recognition, and Clustering", In IEEE Intl. Conf. Comp. Vis., Beijing, China, Oct. 2005, pp. 1589-1596.

Zheng, Y., et al, "Four-Chamber Heart Modeling and Automatic Segmentation for 3D Cardiac CT Volumes Using Marginal Space Learning and Steerable Features", IEEE Transactions on Medical Imaging, 27(11), Nov. 2008, pp. 1668.-1681.

Bharatha, A., et al. "Evaluation of Three-Dimensional Finite Element-Based Deformable Registration of Pre-and Intraoperative Prostate Imaging", Medical Physics 28(12) pp. 2551-2560, (2001).

Gubern-Merida, A., et al. "Atlas Based Segmentation of the Prostate in MR Images", MICCAI 2009 Prostate Segmentation Challenge, London UK. (2009).

Heimann T., et al., "3D Segmentation in the Clinic: A Grand Challenge", pp. 7-15. (2007).

Klein, S., et al. "Segmentation of the Prostate in MR Images by Atlas Matching", Proceeding of IEEE International Symposium on Biomedical Imaging, pp. 13001303. (2007).

* cited by examiner 600　　　　　　　　610　　　　　　　　620

METHOD AND SYSTEM FOR AUTOMATIC PROSTATE SEGMENTATION IN MAGNETIC RESONANCE IMAGES

This application claims the benefit of U.S. Provisional Application No. 61/674,912, filed Jul. 24, 2012, the disclosure of which is herein incorporated by reference.

BACKGROUND OF THE INVENTION

The present invention relates to medical imaging of the prostate, and more particularly, to automatic segmentation of the prostate in magnetic resonance images.

Detection and delineation of the prostate in medical image data is an important problem in medical imaging analysis. For example, prostate cancer is often treated by radiation therapy where precise targeting of the prostate is important. The improved contrast of magnetic resonance (MR) abdominal image over other imaging modalities affords more accurate and consistent manual contouring of the prostate. Consequently, MR imaging now plays an increasing role in prostate radiotherapy planning. Accordingly, automated methods for segmenting abdominal structures in MR are desirable to improve the clinical workflow. However, automated segmentation of the prostate in MR images is challenging due to global inter-scan variability and intra-scan intensity variation caused by an endorectal coil, as well as due to the similar appearance of the prostate and the seminal vesicles at the apex, geometric variability due to disease, and adjacent structures such as the rectum and the bladder.

Conventional approaches for automatic prostate segmentation are typically registration-based. That is, one or more template images with segmentations are registered to the target image and the aligned segmentations are fused. Variation in intensity and appearance are typically overcome through the use of appropriate energy (e.g., mutual information) and the use of multiple templates. Although such registrations methods perform well when one of the templates is similar to the target image, they are often computationally expensive, typically requiring several minutes to return a segmentation.

BRIEF SUMMARY OF THE INVENTION

The present invention provides a method and system for automatically segmenting the prostate in magnetic resonance (MR) images. Embodiments of the present invention provide a fully automatic segmentation of the prostate in an MR image with a relatively short processing time so that the segmentation results can be efficiently used for radiation therapy planning. Instead of using an explicit registration of images, embodiments of the present invention compactly represent a training set of images with discriminative classifiers that are used to align a statistical mesh model of the prostate onto an MR image. Rather than relying on edge detectors or hand-designed features, embodiments of the present invention utilize classifiers that aggregate and choose the best image features from a large feature pool.

In one embodiment, intensity normalization is performed on an MR image of a patient. An initial prostate segmentation in the MR image is obtained by aligning a learned statistical shape model of the prostate to the MR image using marginal space learning (MSL). The initial prostate segmentation is refined using one or more trained boundary classifiers.

These and other advantages of the invention will be apparent to those of ordinary skill in the art by reference to the following detailed description and the accompanying drawings.

DETAILED DESCRIPTION

The present invention is directed to a method and system for fully automatic segmentation of the prostate in magnetic resonance (MR) images. Embodiments of the present invention are described herein to give a visual understanding of the prostate segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to automated prostate segmentation in MR images. Embodiments of the present invention utilize learning-based methods and hierarchical boundary definition for efficient, accurate segmentation of the prostate in MR image data, such as T2 weighted MR image data. Embodiments of the present invention normalize intra- and inter-image intensity variation, and then utilize Marginal Space Learning (MSL) to align a statistical mesh model of the prostate onto an MR image. This mesh is then hierarchically refined to the prostate boundary in the MR image using spatially varying surface classifiers. Embodiments of the present invention, when applied to T2-weighted abdominal MR scans by the present inventors, provide accurate prostate segmentations (dice coefficient of 0.85 and 2.12 mm surface error) in less than 3 seconds.

Figure 1:
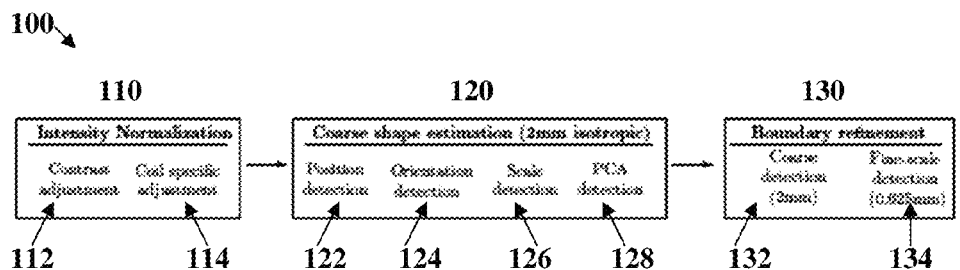
FIG. 1 illustrates a segmentations pipeline for automatic prostate segmentation according to an embodiment of the present invention.

FIG. 1 illustrates a segmentations pipeline for automatic prostate segmentation 100 according to an embodiment of the present invention. The segmentation pipeline 100 of FIG. 1 addresses challenges of MR prostate segmentation through the use of robust machine learning techniques. To overcome inter-scan and intra-scan intensity variability, the segmentation pipeline 100 starts with an intensity normalization stage 110. The intensity normalization stage 110 includes a contrast adjustment 112 and a coil specific adjustment 114. The contrast adjust 112 performs intensity normalization to adjust for global contrast changes due to variations between MR scans. The coil specific adjustment 114 further enhances images acquired with an endorectal coil (ERC) by flattening the intensity profile on the bright regions near the coil. The next stage of the segmentation pipeline 100 is a coarse shape estimation stage 120, in which a statistical model of shape variation is aligned to the normalized magnetic resonance images using marginal space learning (MSL). The coarse shape estimate stage 120 using marginal space learning includes position detection 122, position-orientation detection 124, position-orientation-scale detection 126, and principal component analysis (PCA) statistical shape model detection 128. The next stage of the segmentation pipeline 100 is a boundary refinement stage 130, which refines the shape initialization resulting from the coarse shape estimation stage 120 using a coarse-to-fine boundary refinement that uses surface classifiers to discriminate the boundary of the prostate from adjacent soft tissue. The boundary refinement stage 130 can include a coarse boundary detection 132 and a fine-scale boundary detection 134. To ensure a feasible shape of the final prostate segmentation, the final refinement in the fine-scale boundary detection 134 can constrain the resulting shape by the statistical shape model of the prostate.

Figure 2:
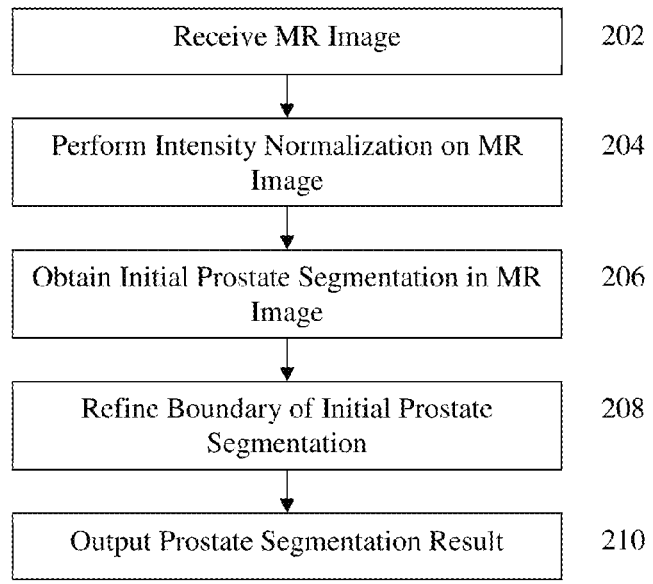
FIG. 2 illustrates a method for automatic prostate segmentation in MR image data according to an embodiment of the present invention.

FIG. 2 illustrates a method for automatic prostate segmentation in MR image data according to an embodiment of the present invention. The method of FIG. 2 transforms MR image data of a patient to generate a segmentation of the patient's prostate. The method of FIG. 2 illustrates a possible implementation of the segmentation pipeline 100 of FIG. 1, and features of the segmentation pipeline 100 of FIG. 1 will be described in greater detail below. Referring to FIG. 2, at step 202, an MR image of a patient is received. The MR image can be a 3D MR image volume resulting from an MR scan. The MR image can be received directly from an MR scanner or the MR image can be received by loading a previously stored MR image of the patient. In a possible implementation, the MR image may be a T2-weighted axial abdominal scan, but the present invention is not limited thereto.

At step 202, intensity normalization is performed on the MR image to compensate for intensity variations between the MR image and other MR images from different MR scans and to compensate for intensity variations within the MR image. According to an advantageous embodiment of the present invention, a two phase intensity normalization can be performed, in which a first phase normalizes intensities of the MR image to adjust for global contrast changes between the MR image and other MR scans, and a second phase normalizes the intensities of the MR image to adjust for intensity variations within the MR image due to an endorectal coil (ERC) used to acquire the MR image.

Figure 3:
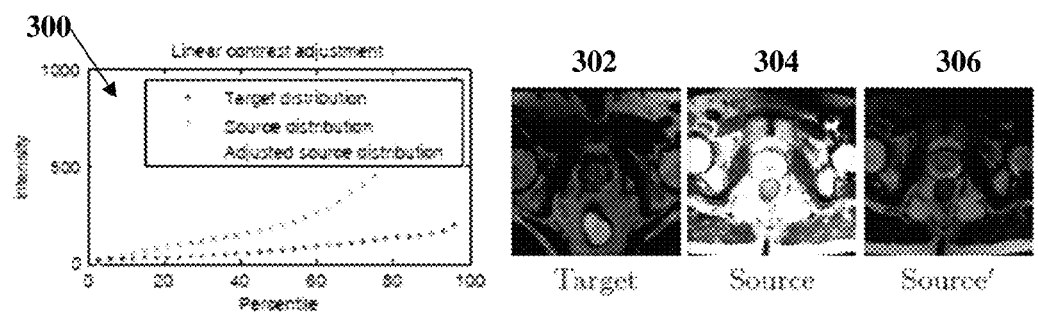
FIG. 3 illustrates exemplary linear contrast adjustment of a source image based on a training image.

In the first intensity normalization phase, a brightness and contrast adjustment is applied to the intensities of the MR image based on a stored target or reference image. One image in a set of stored training images is selected as the target image, $\hat{I}$, a least squares solution for the linear transformation a source image, $I_i$, is calculated as:

$$a, b = \operatorname{argmin}_{a,b} \sum_{j=3}^{98} \left( prctile(\hat{I}, j) - (prctile(I_i, j)a + b) \right)^2, \quad (1)$$

$$I'_i = I_i a + b, \quad (2)$$

where $prctile(\hat{I}, j)$ is the $j^{th}$ percentile of the intensities of the target image and $prctile(I_i, j)$ is the $j^{th}$ percentile of the intensities of the source image. Accordingly, translation parameters a,b are found to transform the source image $I_i$ into an adjusted source image $I_i'$ that minimizes the least squares error between the intensities of the target image $\hat{I}$ and the adjusted source image $I_i'$ within the $3^{rd}$ through $98^{th}$ percentile of their intensity distributions. In step 204 of FIG. 2, the source image is the current MR image received at step 202 and the target image is a stored reference image in a set of training images. This normalization is also used to normalize the intensities of each of the remaining training images with respect to the selected target image. FIG. 3 illustrates exemplary linear contrast adjustment of a source image based on a training image. As illustrated in FIG. 3, image 300 shows a graph of intensity distributions for a target image, a source image, and an adjusted source image. Image 302 shows the target image, image 304 shows the source image before contrast adjustment, and image 306 shows the adjusted source image resulting from transforming the source 304 based on the target image 302 using Equations (1) and (2).

For MR images acquired with an endorectal coil (ERC), the present inventors have found that sharp spikes in intensity near the coil have a negative impact on prostate segmentation results. The second phase of intensity normalization seeks to reduce the overall brightness of these regions while retaining local image structure. In an advantageous embodiment, the input image is thresholded to obtain a mask, which is used to define a domain of a bright region for Poisson image editing. The Poisson image editing retains gradient features within the bright region, but reduces the overall intensity within the bright region.

The MR image is thresholded to obtain a mask image a mask image $M=((I>\tau_1)\oplus B) \wedge (i>\tau_2)$, where the intensity thresholds, $\tau_1$ and $\tau_2$, are chosen such that $\tau_1 > \tau_2$ and $\oplus B$ is a dilation with a circular ball. The bright region, $\Omega \subset R^2$, is extracted from the image as the non-zero elements of the mask image M. Adjusted intensities, $f:\Omega \mapsto R$, are then calculated for the bright region such that the intensities at the boundary of $\Omega$ match the surrounding image region in the input image, and so that the gradient within $\Omega$ is similar to a high pass version of the input image. Letting $g(x)=(I-G_\sigma*I)(x)$ be the high pass filtered image, with Gaussian $G_\sigma$, the adjusted intensities within the bright region are calculated by solving the minimization problem:

$$E(f) = \min \int_{\Omega} |\nabla f - \nabla g \oplus|^2 dx \text{ where } f=I \text{ on } \delta\Omega. \quad (3)$$

The minimizer of Equation (3) is a solution to the Poisson equation:

$$\nabla^2 f = \nabla \nabla^2 g \quad (4)$$

Figure 4:
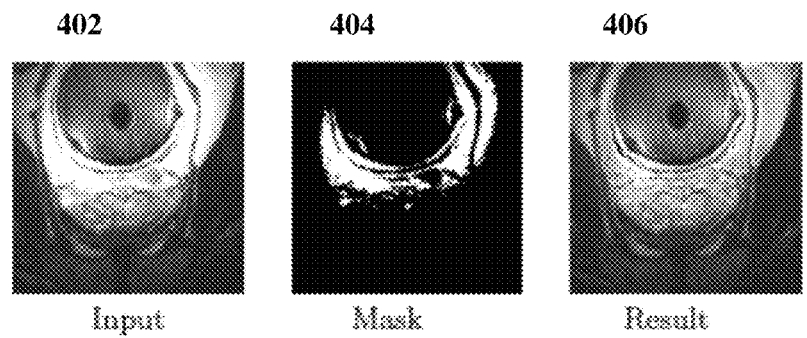
FIG. 4 illustrates an example of intensity adjustment using Poisson editing.

This normalization can be applied per slice of an MR volume. In an exemplary implementation, $\sigma=4$ can be used for the Gaussian filtering. FIG. 4 illustrates an example of intensity adjustment using Poisson editing. As illustrated in FIG. 4, image 402 shows an input MR image, image 404 shows a mask extracted by thresholding the input MR image 402, and image 406 shows a result of adjusting intensities in a bright region of the input image 402 defined by the mask 404 using Equations (3) and (4). As shown in image 404, the adjusted image retains gradient features within the bright region, but the overall intensity within that region is reduced.

Returning to FIG. 2, at step 206, an initial prostate segmentation is obtained in the MR image by aligning a statistical shape model of the prostate to the MR image using marginal space learning (MSL). Aligning the statistical shape model of the prostate to the MR image results in a surface mesh representing the segmented prostate in the MR image. The statistical shape model of the prostate is learned from a stored set of annotated training images. In order to build the statistical shape model, binary input training segmentation masks (i.e., the annotated prostate segmentations in the training images) are first converted to a mesh representation using the well-known marching cubes algorithm. The resulting meshes are then evenly sampled and brought into alignment using iterated closest points. The result is a single of triangles, T, and the M vertex position $V_i = \{v_{ij}\}_{j=1}^M$, for each training image, i.

Using these corresponding shapes, orientation and scale variation are removed using Procrustes analysis, which gives a mean shape, $\overline{V}=\{\overline{v}_j\}_{j=1}^M$, and the orientation $r_i$, scale $s_i$, and translation $p_i$ that best map the mean shape to the input training meshes $V_i$. The remaining variability in the shape is represented with a point distribution model, and the strongest shape modes $U_k=\{u_{kj}\}$ are extracted using principal component analysis (PCA). The shape of the prostate can then be represented as a linear combination of the modes, blended with the shape coefficients $\lambda_k$:

$$v_j = \overline{v}_j + \sum_{k=1} u_{kj}\lambda_k. \quad (5)$$

In exemplary embodiment, two levels of mesh hierarchy can be used for efficiency: a finer resolution and a coarser resolution. In an exemplary implementation, the finer resolution has 1127 vertices and 2250 triangles, and the coarser resolution ha 565 vertices and 1126 triangles. The coarser resolution is obtained by downsampling the mean shape and extracting the corresponding vertices.

The initial segmentation of the prostate in the current MR image I is obtained by aligning the learned shape model to the current image data. According to an advantageous embodiment of the present invention, Marginal Space Learning (MSL) is used to recover the unknown pose parameters and the first three shape coefficients $\lambda_{1:3}$, for the current MR image by approximating the posterior:

$$\theta=(p,r,s,\lambda_{1:3})=\arg\max_{p,r,s,\lambda_{1:3}} Pr(p,r,s,\lambda_{1:3}|I). \quad (6)$$

MSL-based 3D object detection estimates the position, orientation, and scale of the target anatomical structure in the 3D medical image data using a series of discriminative classifiers trained using annotated training data. For example, a method for MSL-based heart chamber segmentation is described in detail in U.S. Pat. No. 7,916,919, issued Mar. 29, 2011, and entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers.

Accordingly, instead of searching for all parameters simultaneously, MSL decomposes the search space into subsequent estimates of 3D searches over position, orientation, and scale. That is, the detection of the pose parameters is split into three steps: object position estimation, position-orientation estimation, and position-orientation-scale estimation. A separate discriminative classifier is trained based on annotated training data for each of these steps. The position is first estimated, and the posterior $Pr(p|I)$ is approximated using a discriminative classifier (position classifier), $$Pr(p|I)=Pr(y=+1|I,p), \quad (7)$$

where the binary random variable y takes a value of +1 if the prostate is at position p in the image I. In other words, a set of likely position candidates in the MR image is detected by scanning the trained position classifier over the image.

Given the detected position candidates, a set of position-orientation candidates can be detected in the MR image using the discriminative classifier (position-orientation classifier), $$Pr(r|I,p)=Pr(y=+1|I,p,r), \quad (8)$$

where the search by the position-orientation classifier augments each of the detected position candidates with a plausible set of orientations learned from the training data. The scale and first three PCA components are then estimated analogously to the orientation. In particular, a position-orientation-scale classifier detects a set of position-orientation-scale candidates based on the set of position-orientation candidates, where the search by the position-orientation-scale augments each of the detected position-orientation candidates with a set of plausible scales. Each position-orientation-scale candidate defines a bounding box that aligns the mean shape of the prostate to the MR image. The PCA shape coefficients are then detected based on the position-orientation-scale candidates using a trained PCA shape coefficient discriminative classifier. In particular, the PCA shape coefficient discriminative classifier searches a set of plausible PCA shape coefficients at each of the detected position-orientation-scale candidate in order to detect the alignment of the statistical shape model of the prostate to the MR image having the highest probability.

For each of the discriminative classifiers (position, orientation, scale, and PCA), a probabilistic boosting tree (PBT) may be trained using the known poses and image data in the training set. For the pose estimation, the volume data can be resampled to a coarser resolution, such as 2 mm isotropic. Position detection uses 3D Haar features. Orientation, scale, and PCA shape coefficient estimates use steerable features sampled within a bounding box of an oriented cube.

Returning to FIG. 2, at step 208, the boundary of the initial prostate segmentation is refined. The pose estimated using MSL aligns the statistical shape model of the prostate to the MR image, resulting in a mesh giving a good initial segmentation of the prostate. The mesh surface is then iteratively refined using a non-rigid, hierarchical boundary deformation. Each mesh vertex is displaced $v_i \leftarrow v_i + t_i n_i$ along the surface normal $n_i$ by detecting the most likely displacement:

$$t_i=\arg\max_{-\tau \leq t \leq \tau} Pr(v_i + tn_i|I), \quad (9)$$

where $Pr(v_i+tn_i|I)$ is modeled with a trained discriminative classifier, and the search for the best displacement is limited to the range $\tau$ in both directions along the surface normal $n_i$. After displacing each point (vertex) on the prostate mesh independently, regularity is imposed by projecting the resulting shape onto the learned linear shape space of the prostate. These steps of refining the mesh by independently displacing each point and then projecting the refined shape onto the learned linear shape space of the prostate can be iterated for a set number of iterations or until convergence is achieved. In a possible implementation, $\tau$ can be reduced with each iteration.

The boundary refinement can be implemented hierarchically, by first performing the boundary refinement on first on a low resolution mesh and then on a higher resolution mesh. For example, in a possible implementation, the boundary refinement is performed first on a low resolution mesh and 2 mm isotropic volumes. In a subsequent phase, the mesh is upsampled and a finer scale refinement is performed. In this exemplary implementation, ten iterations are performed at each level of the mesh hierarchy, and $\tau$ is reduced by a factor of 0.8 with each iteration.

Figure 5:
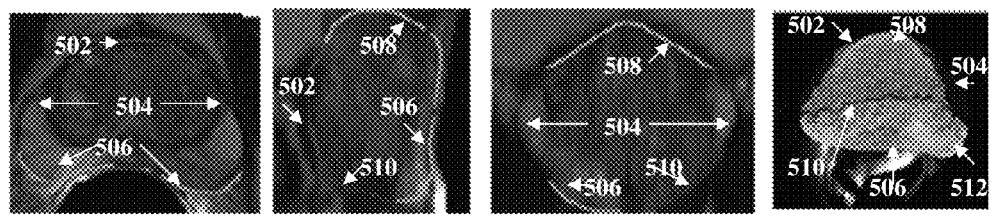
FIG. 5 illustrates an example of partitioning the surface of the prostate to provide region specific boundary classifiers.

For the higher resolution mesh, in order to account for the varying surface appearance on different regions of the prostate boundary, separate boundary classifiers are utilized for the different regions of the prostate boundary. In a possible implementation, the prostate surface boundary can be partitioned into six regions near the bladder, rectum, and peripheral zone. FIG. 5 illustrates an example of partitioning the surface of the prostate to provide region specific boundary classifiers. As shown in FIG. 5, the surface mesh of the prostate is partitioned into six regions 502, 504, 506, 508, 510, and 512. These regions have different surface characteristics and a separate boundary classifier is trained for each region.

Each discriminative boundary classifier can be trained based on the set of training data using a PBT classifier and steerable features. Positive samples for each classifier are taken from ground truth mesh points, and negative samples are chose within a predefined distance from the mesh. The sampling pattern of the steerable features and the negative range can be optimized using a testing set.

Returning to FIG. 2, at step 210, the prostate segmentation results are output. For example, the prostate segmentation results can be output by displaying the prostate segmentation results on a display of a computer system, or other display device. It is also possible that the prostate segmentation results can be output by storing the prostate segmentation results, for example, on a storage or memory of a computer system or on a computer readable medium.

Figure 6:
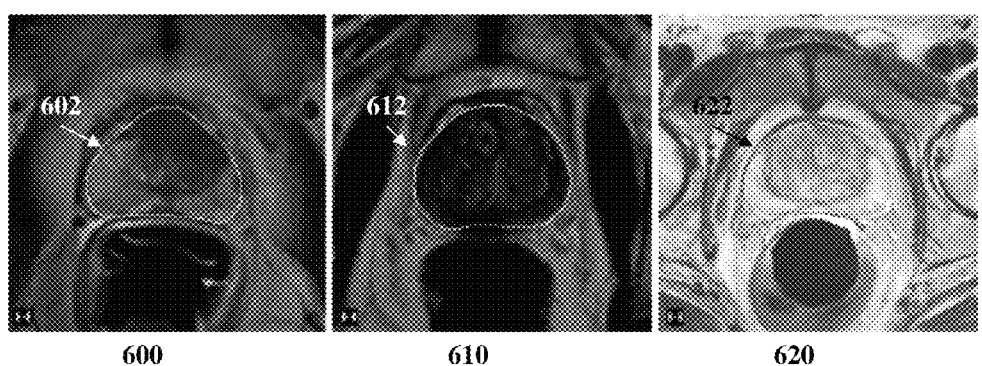
FIG. 6 illustrates exemplary prostate segmentation results segmented using the method of FIG. 2.

FIG. 6 illustrates exemplary prostate segmentation results segmented using the method of FIG. 2. As illustrated in FIG. 6, image 600 shows a segmented prostate 602 in a first MR image. Image 610 shows a segmented prostate 612 in a second MR image. Image 620 shows a segmented prostate in a third MR image.

Figure 7:
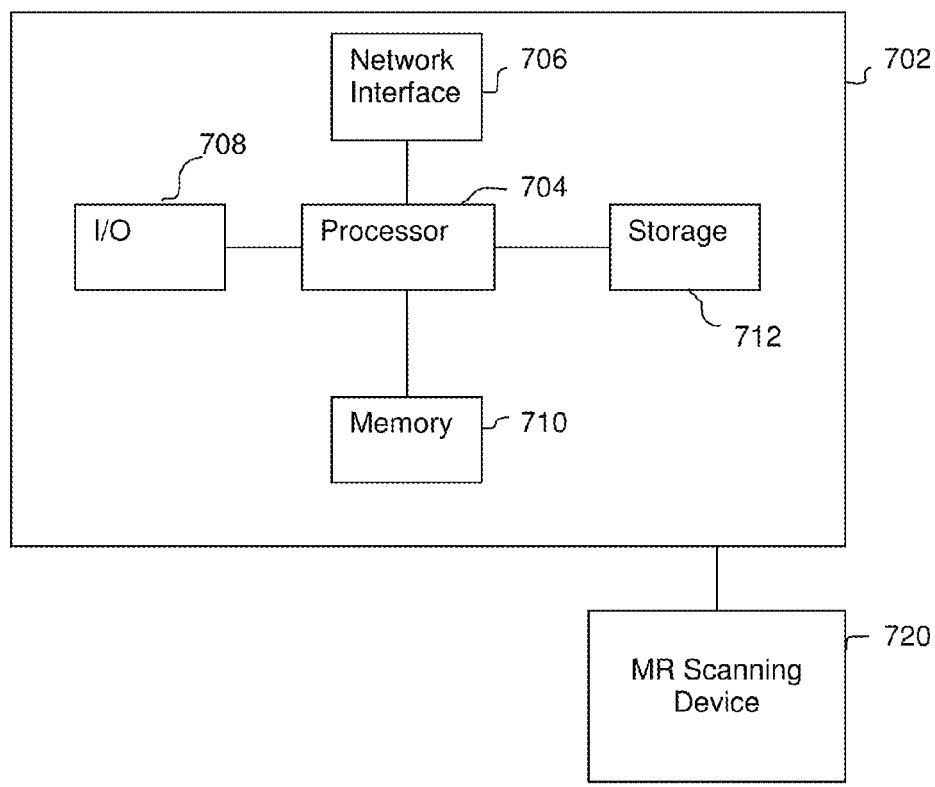
FIG. 7 is a high level block diagram of a computer capable of implementing the present invention.

The above-described methods for prostate segmentation in MR images may be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712, or other computer readable medium (e.g., magnetic disk, CD ROM, etc.) and loaded into memory 710 when execution of the computer program instructions is desired. Thus, the steps of the method of FIG. 2 may be defined by the computer program instructions stored in the memory 710 and/or storage 712 and controlled by the processor 704 executing the computer program instructions. An MR scanning device 720 can be connected to the computer 702 to input the multi-spectral MR images to the computer 702. It is possible to implement the MR scanning device 720 and the computer 702 as one device. It is also possible that the MR scanning device 720 and the computer 702 communicate wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.). One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method for automatic prostate segmentation in magnetic resonance (MR) image data, comprising:
performing a first intensity normalization on the MR image to adjust for global contrast changes between the MR image and other MR scans;
performing a second intensity normalization on the MR image to adjust for intensity variation within the MR image due to an endorectal coil used to acquire the MR image by:
obtaining a mask image from the MR image using intensity thresholding,
extracting a bright region from the MR image using the mask image, and
calculating adjusted intensities to reduce an overall intensity within the bright region such that the adjusted intensities at a boundary of the bright region match a surrounding region in the MR image and gradient features within the bright region are retained;
obtaining an initial prostate segmentation in the MR image by aligning a learned statistical shape model of the prostate to the MR image using marginal space learning (MSL); and
refining the initial prostate segmentation using one or more trained boundary classifiers.

2. The method of claim 1, wherein the MR image is a 3D MR image resulting from a T2-weighted axial abdominal MR scan.

3. The method of claim 1, wherein performing the first intensity normalization on the MR image to adjust for global contrast changes between the MR image and other MR scans comprises:
calculating a linear transformation of the MR image that minimizes a least square error between at least a portion of intensity distributions of a stored target image and the MR image; and
adjusting intensities of the MR image using the linear transformation.

4. The method of claim 3, wherein:
calculating the linear transformation of the MR image that minimizes the least square error between at least the portion of intensity distributions of the stored target image and the MR image comprises calculating the linear transformation as:

$$a, b = \operatorname{argmin}_{a,b} \sum_{j=3}^{98} \left( prctile(\hat{I}, j) - (prctile(I_i, j)a + b) \right)^2,$$

where $\hat{I}$ is the stored target image, $I_i$ is the MR image, $prctile(\hat{I}, j)$ is the $j^{th}$ percentile of the intensities of the stored target image and $prctile(I_i, j)$ is the $j^{th}$ percentile of the intensities of the MR image; and
adjusting intensities of the MR image using the linear transformation comprises generating an adjusted image as: $I_i' = I_i a + b$.

5. The method of claim 1, wherein performing the second intensity normalization on the MR image to adjust for intensity variation within the MR image due to the endorectal coil used to acquire the MR image comprises:

obtaining the mask image as $M=((I>\tau_1)\oplus B)\wedge(I>\tau_2)$, where I is the MR image, $\tau_1$ and $\tau_2$ are intensity thresholds, $\tau_1 > \tau_2$, and $\oplus B$ is a dilation with a circular ball;

extracting the bright region $\Omega \wedge R^2$ from the MR image $\Omega \wedge R^2$, as the non-zero elements of the mask image M;

generating a high pass filtered image as $g(x)=(I-G_\sigma *I)(x)$, where $G_\sigma$ is a Gaussian function; and calculating adjusted intensities within the bright region f: $\Omega \mapsto R$ as $E(f)=\min\int_\Omega |\nabla f - \nabla g|^2 dx$ where f=I on $\delta\Omega$ by solving a Poisson equation: $\nabla^2 f = \nabla^2 g$.

6. The method of claim 1, wherein the statistical shape model of the prostate represents the shape of the prostate as a linear combination of a mean prostate shape and a number of strongest shape modes each weighted by a respective shape coefficient.

7. The method of claim 6, wherein the mean prostate shape and the number of strongest shape modes are learned from a set of annotated training images.

8. The method of claim 6, wherein obtaining the initial prostate segmentation in the MR image by aligning the learned statistical shape model of the prostate to the MR image using marginal space learning (MSL) comprises:

detecting position candidates for the prostate in the MR image using a first discriminative classifier;

detecting position-orientation candidates for the prostate in the MR image based on the detected position candidates using a second discriminative classifier;

detecting position-orientation-scale candidates for the prostate in the MR image based on the detected position-orientation candidates using a third discriminative classifier, wherein each position-orientation-scale candidate defines a candidate bounding box for aligning the mean prostate shape to the MR image; and detecting the respective shape coefficient for each of the number of strongest shape modes based on the detected position-orientation-scale candidates using a fourth discriminative classifier.

9. The method of claim 8, wherein the number of strongest shape modes comprises three strongest shape modes.

10. The method of claim 1, wherein refining the initial prostate segmentation using one or more trained boundary classifiers comprises:

refining a prostate surface mesh resulting from the initial prostate segmentation by calculating a displacement for each of a plurality of vertices of the mesh along a surface normal using the one or more trained boundary classifiers; and projecting a shape of the refined prostate surface mesh to a learned statistical shape space of the prostate.

11. The method of claim 1, wherein refining the initial prostate segmentation using one or more trained boundary classifiers comprises:

refining a low resolution prostate surface mesh resulting from the initial prostate segmentation by performing a number of iterations of:

refining vertices of the low resolution prostate surface mesh using a first trained boundary classifier, and projecting a shape of the refined low resolution prostate surface mesh to a learned statistical shape space of the prostate;

upsampling the refined low resolution prostate surface mesh to generate a high resolution prostate surface mesh; and refining the high resolution prostate surface mesh by performing a number of iterations of:

refining vertices of the high resolution prostate surface mesh using one or more second trained boundary classifiers, and projecting a shape of the refined high resolution prostate surface mesh to the learned statistical shape space of the prostate.

12. The method of claim 11, wherein refining vertices of the high resolution prostate surface mesh using one or more second trained boundary classifiers comprises:

partitioning the high resolution prostate surface mesh into a plurality of regions; and refining the vertices of the high resolution surface mesh using a different discriminative classifier for each of the plurality of regions.

13. An apparatus for automatic prostate segmentation in magnetic resonance (MR) image data, comprising:

means for performing a first intensity normalization on the MR image to adjust for global contrast changes between the MR image and other MR scans;

means for performing a second intensity normalization on the MR image to adjust for intensity variation within the MR image due to an endorectal coil used to acquire the MR image, comprising:

means for obtaining a mask image from the MR image;

means for extracting a bright region from the MR image using the mask image, and means for calculating adjusted intensities to reduce an overall intensity within the bright region such that the adjusted intensities at a boundary of the bright region match a surrounding region in the MR image and gradient features within the bright region are retained;

means for obtaining an initial prostate segmentation in the MR image by aligning a learned statistical shape model of the prostate to the MR image using marginal space learning (MSL); and means for refining the initial prostate segmentation using one or more trained boundary classifiers.

14. The apparatus of claim 13, wherein the statistical shape model of the prostate represents the shape of the prostate as a linear combination of a mean prostate shape and a number of strongest shape modes each weighted by a respective shape coefficient.

15. The apparatus of claim 14, wherein the means for obtaining the initial prostate segmentation in the MR image by aligning the learned statistical shape model of the prostate to the MR image using marginal space learning (MSL) comprises:

means for detecting position candidates for the prostate in the MR image using a first discriminative classifier;

means for detecting position-orientation candidates for the prostate in the MR image based on the detected position candidates using a second discriminative classifier;

means for detecting position-orientation-scale candidates for the prostate in the MR image based on the detected position-orientation candidates using a third discriminative classifier, wherein each position-orientation-scale candidate defines a candidate bounding box for aligning the mean prostate shape to the MR image; and means for detecting the respective shape coefficient for each of the number of strongest shape modes based on the detected position-orientation-scale candidates using a fourth discriminative classifier.

16. The apparatus of claim 13, wherein the means for refining the initial prostate segmentation using one or more trained boundary classifiers comprises:

means for refining a prostate surface mesh resulting from the initial prostate segmentation by calculating a displacement for each of a plurality of vertices of the mesh along a surface normal using the one or more trained boundary classifiers; and means for projecting a shape of the refined prostate surface mesh to a learned statistical shape space of the prostate.

17. A non-transitory computer readable medium storing computer program instructions for automatic prostate segmentation in magnetic resonance (MR) image data, the computer program instructions when executed on a processor cause the processor to perform operations comprising:

performing a first intensity normalization on the MR image to adjust for global contrast changes between the MR image and other MR scans;

performing a second intensity normalization on the MR image to adjust for intensity variation within the MR image due to an endorectal coil used to acquire the MR image by:
  obtaining a mask image from the MR image using intensity thresholding,
  extracting a bright region from the MR image using the mask image, and
  calculating adjusted intensities to reduce an overall intensity within the bright region such that the adjusted intensities at a boundary of the bright region match a surrounding region in the MR image and gradient features within the bright region are retained;

obtaining an initial prostate segmentation in the MR image by aligning a learned statistical shape model of the prostate to the MR image using marginal space learning (MSL); and refining the initial prostate segmentation using one or more trained boundary classifiers.

18. The non-transitory computer readable medium of claim 17, wherein performing the first intensity normalization on the MR image to adjust for global contrast changes between the MR image and other MR scans comprises:

calculating a linear transformation of the MR image that minimizes a least square error between at least a portion of intensity distributions of a stored target image and the MR image; and adjusting intensities of the MR image using the linear transformation.

19. The non-transitory computer readable medium of claim 17, wherein the statistical shape model of the prostate represents the shape of the prostate as a linear combination of a mean prostate shape and a number of strongest shape modes each weighted by a respective shape coefficient.

20. The non-transitory computer readable medium of claim 19, wherein obtaining the initial prostate segmentation in the MR image by aligning the learned statistical shape model of the prostate to the MR image using marginal space learning (MSL) comprises:

detecting position candidates for the prostate in the MR image using a first discriminative classifier;

detecting position-orientation candidates for the prostate in the MR image based on the detected position candidates using a second discriminative classifier;

detecting position-orientation-scale candidates for the prostate in the MR image based on the detected position-orientation candidates using a third discriminative classifier, wherein each position-orientation-scale candidate defines a candidate bounding box for aligning the mean prostate shape to the MR image; and detecting the respective shape coefficient for each of the number of strongest shape modes based on the detected position-orientation-scale candidates using a fourth discriminative classifier.

21. The non-transitory computer readable medium of claim 17, wherein refining the initial prostate segmentation using one or more trained boundary classifiers comprises:

refining a prostate surface mesh resulting from the initial prostate segmentation by calculating a displacement for each of a plurality of vertices of the mesh along a surface normal using the one or more trained boundary classifiers; and projecting a shape of the refined prostate surface mesh to a learned statistical shape space of the prostate.

* * * * *